United States Patent [19]

Dickey

[11] 4,133,185
[45] Jan. 9, 1979

[54] AUTOMATIC AIR CIRCULATION CONTROL

[75] Inventor: Robert B. Dickey, Seattle, Wash.
[73] Assignee: PACCAR Inc., Bellevue, Wash.
[21] Appl. No.: 892,501
[22] Filed: Apr. 3, 1978

Related U.S. Application Data

[63] Continuation of Ser. No. 734,374, Oct. 20, 1976, abandoned.

[51] Int. Cl.$^2$ .................. F25B 39/04; F01P 7/10
[52] U.S. Cl. ................................ 62/179; 62/184; 62/323; 123/41.12; 236/35.3
[58] Field of Search .................. 62/323, 179, 184; 236/35.2, 35.3; 123/41.12

[56] References Cited

U.S. PATENT DOCUMENTS

| | | | |
|---|---|---|---|
| 2,591,392 | 4/1952 | Weiser | 236/35.3 UX |
| 3,004,402 | 10/1961 | Dart et al. | 62/183 |
| 3,759,056 | 9/1973 | Graber | 62/181 X |

*Primary Examiner*—William E. Wayner
*Attorney, Agent, or Firm*—Seed, Berry, Vernon & Baynham

[57] ABSTRACT

An automotive vehicle of the type having an air conditioner condenser in line with shutters, a radiator and a de-energizable fan is provided with a pressure-sensing switch in the condenser to measure pressure increases in the refrigerant, a radiator coolant temperature sensor and a manual fan override switch all of which are combined to energize the shutter and fan controls so that the shutters will always be open when the fan is on, both the shutters and fan will be on during high temperature coolant conditions, and the shutter and fan will always be on during high pressure refrigerant conditions regardless of the radiator coolant temperature.

5 Claims, 3 Drawing Figures

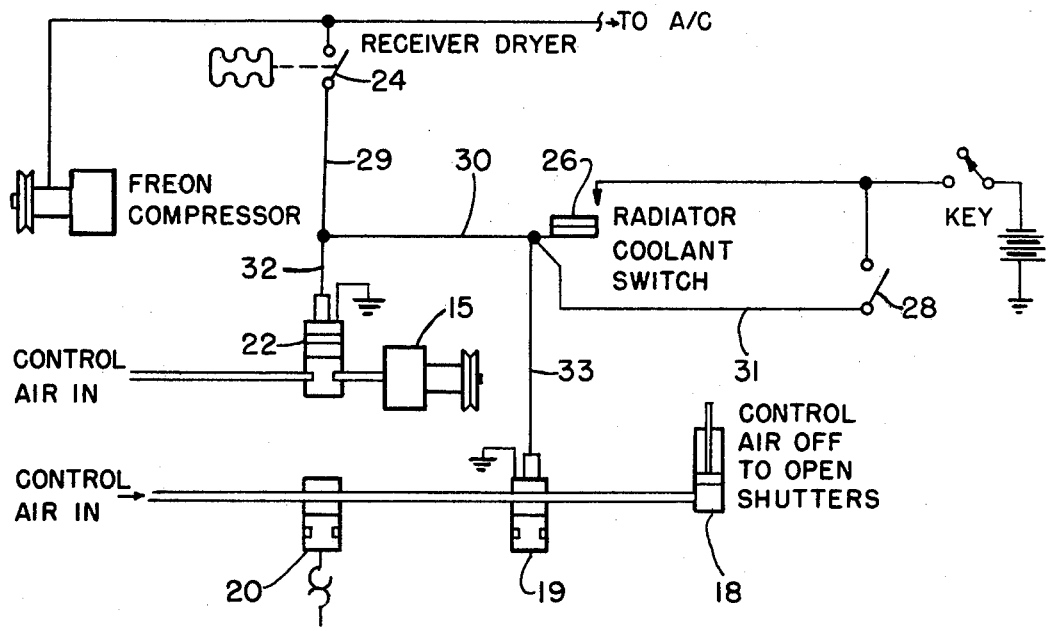
FIG. 1
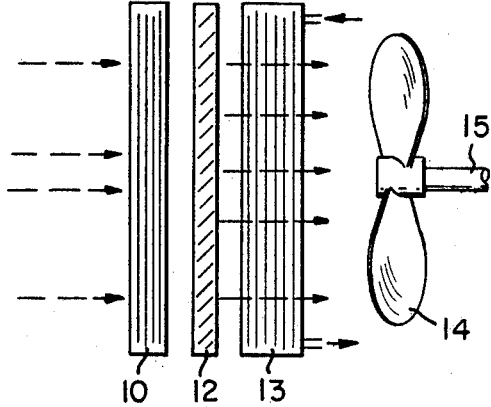
FIG. 2
FIG. 3
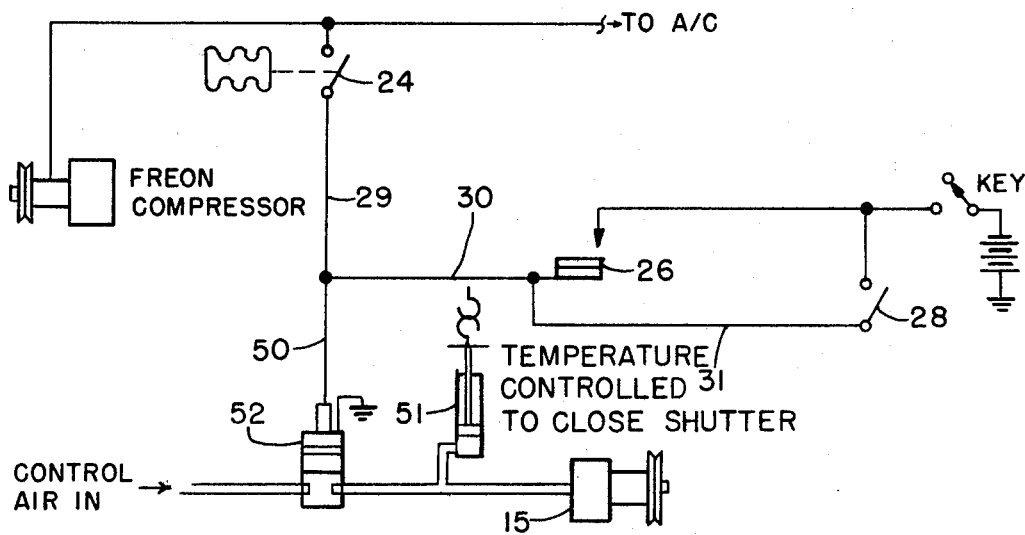

AUTOMATIC AIR CIRCULATION CONTROL

This is a continuation, of application Ser. No. 734,374, filed Oct. 20, 1976, now abandoned.

BACKGROUND OF THE INVENTION

Field of the Invention

This invention pertains to automatic controls for the engine air circulation system through an automotive vehicle condenser, shutter, radiator and fan as commonly used in large trucks and tractor-trailer combinations.

Description of the Prior Art

It is common with large, heavy-duty trucks to provide an air conditioning unit for the cab of the truck with the refrigerant condenser being located in line with the radiator and fan and most commonly placed in front of the radiator and fan. It is also common practice to place louvers or shutters in the air circulation path to block circulation of air through the radiator. Fans are commonly automatically de-energized when not necessary for air circulation. Thus in the normal idling condition a truck engine runs cool such that the shutters will normally be closed and the fan will be de-energized.

As trucks have become more sophisticated with these various air circulation controls, problems have frequently been encountered where the controls conflict with one another or are inadequate to adequately adjust to the various conditions under which the vehicle is used so that one or more of the systems or controls is rendered inoperative and unable to perform its necessary function.

SUMMARY OF THE INVENTION

It is an object of this invention to provide adequate cooling for the air conditioner refrigerant condensor mounted in line with a shutter, radiator, fan type of automotive engine air circulation system.

It is another object of this invention to maintain simultaneous fan energization and shutter opening in an automotive engine air circulation system to avoid unnecessary noise.

Basically these objects are obtained by providing a pressure sensor in the refrigerant condensing system to measure abnormally high pressures and as a result of such sensing, to control the opening of the shutters and energize the fan. Additionally, a radiator coolant temperature sensor also controls the shutters and the fan as coolant temperature rises above a predetermined level. In the preferred embodiment, a manual override control is also provided in the vehicle cab which is also coupled to the shutters and fan to maintain the shutters open as the fan is manually energized.

The invention advantageously assures that the shutters are always open when the fan is energized, the shutters and fan will be energized whenever the refrigerant pressure exceeds a certain value regardless of the radiator coolant temperature, and the shutters and fan will also both be energized (open and on, respectively) whenever the radiator coolant temperature increases to a predetermined value while allowing the fan to be de-energized and the shutters closed when the air conditioner is not being used and during low temperature coolant conditions.

BRIEF DESCRIPTION OF THE FIGURES OF THE DRAWING

FIG. 1 is an pneumatic, electrical operational schematic illustrating the principles of the invention.

FIG. 2 is a schematic air circulation diagram for a typical automotive truck engine.

FIG. 3 is a modified form of pneumatic, electrical schematic embodying the principles in the invention.

DETAILED DESCRIPTION OF THE PREFERRED EMBODIMENTS

As best shown in FIG. 2 a typical automotive truck engine air circulation system includes a condensor 10, shutters 12 which can be opened or closed, a radiator 13 and a fan 14 which is provided with a clutch 15 so that the fan can be energized or de-energized. All of these components are well known. Conventionally, the condensor 10 is provided with a pressure relief switch which de-energizes the air conditioner unit at pressures above about 400 psi. This pressure switch is to prevent excessive pressurization of the refrigerant causing damage to the refrigerant circulation system. As is also conventional, the shutters are operated by an air-operated actuator 18 (FIG. 1) which is controlled by an electrically operated air valve 19 and by a temperature controlled air valve 20. The valve 20 senses the temperature of the radiator coolant at the discharge end of the radiator and conventionally is set to close and thus open the shutter when the coolant temperature exceeds about 175° F. The clutch 15 of the fan is conventionally operated by an electrically operated air supply valve 22.

In the invention of this application a second conventional refrigerant pressure-sensing switch 24 is coupled to the refrigerant system so that it closes an electrical circuit when the refrigerant pressure exceeds about 200 psi. Similarly, a conventional radiator coolant temperature switch 26 is operative to sense the radiator coolant at the inlet end of the radiator and to close an electrical circuit when the temperature exceeds about 195° F. Finally, a conventional manually controlled switch 28 is coupled to the electrical circuit such that it can manually close the electrical circuit. The electrical circuit to which the switches 24,26 and 28 are operative to complete is shown by lines 29,30,31,32 and 33. Thus when the pressure switch 24 is closed by the refrigerant exceeding 200 psi, line 29 is energized which energizes lines 32 and 33 to simultaneously open the air supply valve 22 and close the air supply valve 19 to simultaneously open the shutters 12 and energize the fan 14. In this manner, even though the coolant in the radiator is at a normal low temperature at which the shutter and fan is normally de-energized, the shutter and fan will become operative if the refrigerant pressure increases. Thus this condition assures that a cool running, idling engine will still provide air circulation to the refrigerant condensor if the air conditioner is in operation while the engine is idling.

Energization of switch 26 by an increase in the coolant temperature will energize lines 30,32 and 33 to again simultaneously open the shutters and energize the fan. This assures a condition of fan and shutter operation to provide air circulation to an engine which begins to heat up as the vehicle proceeds up a grade on the highway.

Finally, energization of the manual override switch 28 will energize lines 31,30,32 and 33 to again simultaneously open the shutters and energize the fan. This condition will occur particularly during marginal automatic operations when the fan is continuously cycling or hunting due to the engine running close to the triggering coolant temperature. In this instance, the operator normally turns the fan on continuously regardless of the operating condition of the engine and thus with simultaneous energization of line 32 and 33 will assure that the shutters will remain open also when the fan is still energized.

The embodiment illustrated in FIG. 3 is similar in operation and like components are identified by the same reference numerals as in FIG. 1. In this embodiment, however, a temperature controlled shutter operator 51 is in series with the air operated clutch 15 for the fan so that a single electrically operated air control valve 52 will simultaneously open the shutters and energize the fan. Thus in this embodiment a single line 50 provides the circuit necessary to couple the switches 24, 26 and 28 to the air valve control for the shutter and the fan.

While the preferred embodiments of the invention have been illustrated and described, it should be understood that variations will be apparent to one skilled in the art without departing from the principles described herein. Accordingly, the invention is not to be limited to the specific embodiment illustrated in the drawing.

The embodiments of the invention in which an exclusive property or privilege is claimed are defined as follows:

1. An automatic engine air circulation control system for an engine of the type having in line air conditioning refrigerant condenser, air flow shutter, engine coolant radiator and de-energizable fan, the improvement comprising:
   first control means for automatically opening the air flow shutter and energizing the fan when the refrigerant pressure exceeds a predetermined value, and
   second control means for automatically opening the air flow shutter and energizing the fan when the coolant temperature increases to a predetermined value,
   whereby the shutter is open and the fan energized during excessive refrigerant pressures regardless of coolant temperature and the shutter is open and the fan energized during excessive coolant temperatures regardless of refrigerant pressure.

2. The system of claim 1, including a first coolant temperature sensor operatively coupled only to the shutter operator for opening only the shutter during increased coolant temperature below said predetermined temperature value.

3. The system of claim 1, including a manually operated override switch located in the vehicle cab, and means coupling said override switch to both the shutter operator and the fan so as to open the shutter and energize the fan regardless of coolant temperature or refrigerant pressure.

4. The system of claim 2, including a manually operated override switch located in the vehicle cab, and means coupling said override switch to both the shutter operator and the fan so as to open the shutter and energize the fan regardless of coolant temperature or refrigerant pressure.

5. The system of claims 1, 2 or 3, including a fan operator and a shutter operator, wherein said first control means includes a refrigerant pressure responsive switch operatively connected to both the fan operator and the shutter operator, wherein said second control means includes a coolant temperature responsive switch also operatively connected to both the fan operator and the shutter operator.